United States Patent
Brozowski et al.

(10) Patent No.: US 6,769,068 B1
(45) Date of Patent: Jul. 27, 2004

(54) DYNAMIC CREDENTIAL REFRESH IN A DISTRIBUTED SYSTEM

(75) Inventors: Mathew James Brozowski, Durham, NC (US); David E. Cox, Raleigh, NC (US); Jonathan Scott Greenfield, Holly Springs, NC (US); John J. Lambert, Durham, NC (US); Anne Renee Reidelbach, New Hill, NC (US); Sundari M. Revanur, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/389,126

(22) Filed: Sep. 2, 1999

(51) Int. Cl.[7] .................................................. H04L 9/32
(52) U.S. Cl. ........................................................ 713/202
(58) Field of Search ................................. 713/200–202, 713/155–158, 182–186, 175; 705/50–59

(56) References Cited

U.S. PATENT DOCUMENTS

| | | | | | |
|---|---|---|---|---|---|
| 5,638,513 | A | * | 6/1997 | Ananda | 713/201 |
| 5,757,920 | A | * | 5/1998 | Misra et al. | 713/158 |
| 5,764,887 | A | * | 6/1998 | Kells et al. | 713/200 |
| 5,878,138 | A | * | 3/1999 | Yacobi | 380/24 |
| 5,903,882 | A | * | 5/1999 | Asay et al. | 705/44 |
| 5,944,824 | A | * | 8/1999 | He | 713/201 |
| 6,055,636 | A | * | 4/2000 | Hillier et al. | 713/200 |
| 6,128,740 | A | * | 10/2000 | Curry et al. | 713/200 |
| 6,134,550 | A | * | 10/2000 | Van Oorschot et al. | 707/9 |
| 6,226,743 | B1 | * | 5/2001 | Naor et al. | 713/177 |
| 6,233,341 | B1 | * | 5/2001 | Riggins | 380/277 |
| 6,385,731 | B2 | * | 5/2002 | Ananda | 713/202 |
| 6,446,211 | B1 | * | 9/2002 | Colvin | 713/202 |
| 6,460,142 | B1 | * | 10/2002 | Colvin | 713/202 |
| 6,484,264 | B1 | * | 11/2002 | Colvin | 713/202 |
| 6,502,195 | B1 | * | 12/2002 | Colvin | 713/202 |
| 6,609,198 | B1 | * | 8/2003 | Wood et al. | 713/155 |
| 6,668,322 | B1 | * | 12/2003 | Wood et al. | 713/182 |
| 2002/0035689 | A1 | * | 3/2002 | Colvin | 713/168 |
| 2002/0078373 | A1 | * | 6/2002 | Colvin | 713/200 |
| 2002/0078374 | A1 | * | 6/2002 | Colvin | 713/200 |
| 2002/0133712 | A1 | * | 9/2002 | Colvin | 713/193 |
| 2002/0152404 | A1 | * | 10/2002 | Colvin | 713/201 |
| 2002/0152405 | A1 | * | 10/2002 | Colvin | 713/202 |
| 2002/0162016 | A1 | * | 10/2002 | Colvin | 713/200 |
| 2003/0110375 | A1 | * | 6/2003 | Colvin | 713/156 |

FOREIGN PATENT DOCUMENTS

WO    WO 01/77797 A2 * 10/2001    ............ G06F/1/00

* cited by examiner

Primary Examiner—Ayaz Sheikh
Assistant Examiner—Christopher Revak
(74) Attorney, Agent, or Firm—Jerry W. Herndon; Marcia L. Doubet; Jeanine S. Ray-Yarletts (57) ABSTRACT

A method, system, and computer program product code for dynamically refreshing user credentials in a distributed processing environment. The present invention provides for fast, local refresh of credentials by a server if the credentials expire during an on-going secure operation. This technique avoids the need for rolling back the operation and requiring the client to restart after acquiring fresh credentials. The ability for a systems administrator to invalidate credentials which have been compromised is maintained.

27 Claims, 4 Drawing Sheets

DYNAMIC CREDENTIAL REFRESH IN A DISTRIBUTED SYSTEM

BACKGROUND OF THE INVENTION

1. Field of the Invention

The present invention relates to a computer system, and deals more particularly with a method, system, and computer program product for dynamically refreshing client credentials in a distributed, client/server environment.

2. Description of the Related Art

The client/server networking environment provides for distribution of computer-performed work across multiple computers and allows sharing of resources (such as databases, processors, and applications) among multiple users. The benefits of the client/server environment are substantial, including cost savings and reliability, among others. These benefits, however, come at the expense of a number of problems which are associated with client/server or distributed processing. One such problem is the need to provide security to keep unauthorized users from accessing valuable assets such as company databases where trade secrets, financial information and employee information are stored. Even more problematic is the need to ensure that a server application, acting on behalf of an authorized client, has access to only those resources that the client is authorized to use.

Within the client/server environment, a user begins processing by using an application located on a client machine. The client-side application is typically focused on the task of communicating with the user via displays (for example, enabling the user to make requests and then see the results), while the server-side application is typically focused on the tasks of collecting the information needed for the user's request, processing the information, and sending the results of the processing back to the client machine. In the early days of client/server computing, a client application communicated with a server application which completed the processing, or series of tasks, on a single machine, and then returned the results of the processing to the requesting client. As technology in networks and computers evolved, however, so did the complexity of client/server environments. Today, a client/server application may ultimately interoperate with several servers before completing the request and returning the results of the processing to the client. The required processing, or series of tasks, may be distributed among several servers, with each server providing the processing of a particular task. For example, a simple client request may require extracting data from a database, processing the extracted data, and then returning the results to the requesting client. The server machine receiving the request may delegate the data extraction task to a database server, receive the data from the database server, delegate the task of processing the data to a processing server, and return the results to the client when the processing server has completed.

The complexity of the client/server environment has affected the way servers complete tasks initiated by a client. Since multiple servers may be involved in completing the client-initiated tasks, the server applications need to process tasks atomically (i.e. all parts of a task either complete successfully, or all modifications which may have been performed for the incomplete task must be "rolled back" or "backed out"). If a task on one server fails for any reason, then the other server's tasks may need to be terminated (in the case of those still running), canceled (for those tasks that have not been initiated), or backed out (for those tasks that did complete prior to the failure). This leads to very complex distributed application programming code.

With the increasing complexity in the client/server environment, several measures for providing secure communications and protecting resources have been developed. Two measures that address security issues in overall computer use, including the client/server environment, are authentication and authorization.

One aspect of protecting resources is the ability to ensure the person attempting to access the system is, in fact, the person they are purporting to be. This is known as "authentication" and typically involves a user providing a user name (or other identifier) to indicate to the system who the user is and a password (or a secret) used to indicate that it is, in fact, the legitimate user for that user name and not someone trying to impersonate him. Authentication may also include some determination of system-wide privileges or limitations placed on a user. For example, a user may have the ability to make administrative changes to a particular system or cluster of systems, but not to all systems in a computer complex. Authentication is typically done once at the beginning of each user session.

Another aspect of protecting resources is the ability to ensure that an authenticated user is authorized to access a protected resource. An employee, for example, may be authorized to access information related to the work calendar showing the company's designated holidays. This same employee, however, may not be authorized to access the salary database for all employees in the company. In this case, the user may be provided with credentials which indicate the privileges or limitations for this user to access specific information. This aspect is called "authorization".

In a multi-server application environment, authenticating users against password databases may impede performance since the server may have to communicate to distant security servers over a busy network to get to the appropriate password database. When multiple servers are involved in the application, the impact of having multiple accesses to the password database can affect overall performance of the application. To alleviate the need for each server to check a client's password, a client can create a signed credential that includes a specification of the resources a user is authorized to access, as stated above. This credential is only provided after a client is authenticated and provides a valid password. The credential can then be passed along to the server application which can, in turn, validate the credential locally and thereby avoid performance problems associated with validating a user's password. This is common practice today and is well known to those familiar with the art.

To ensure that a user cannot gain indefinite access to protected resources once a credential is obtained, credentials typically expire after some period of time, after which they are no longer accepted as valid. If a credential expires before all associated tasks are completed, the server application typically causes completed tasks to be backed out and the client receives an error code indicating that the credential needs to be refreshed for the operation to be performed. Since the client's password is required to obtain a new credential, the server application cannot act on behalf of the client to request the refreshed credentials. Therefore, the client is required to repeat the process of revalidating the user with a password, obtaining another credential for the protected resources needed by the server application, and retrying the operation. The impact to the client is wasted time caused by the failed processing of the initial request and the need for the request to be re-started after the credentials are refreshed. The impact on the client/server environment can be significant in that the processing time up to the point of the credential expiration is wasted time. In addition, the servers which did complete tasks associated with the request have the additional burden of backing out those tasks which had completed. The need to deal with these problems as part of the normal path of request processing can also lead to increased program complexity.

Accordingly, what is needed is a technique for enabling a server to dynamically refresh a client's credentials in a client/server environment, without disruption to an ongoing secure process being performed for an otherwise authorized client. This technique must preserve a system administrator's ability to invalidate credentials which have been compromised.

SUMMARY OF THE INVENTION

An object of the present invention is to provide a technique whereby a client credential is dynamically refreshed in a client/server environment.

Another object of the present invention is to provide this technique in a complex, multi-server environment, without requiring a restart of in-process secure operations.

A further object of the present invention is to provide this technique in a manner that preserves a system administrator's ability to invalidate compromised credentials and user accounts.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for use in a client/server computing environment for dynamically refreshing user credentials without disruption of an on-going secure process. In a first aspect, this technique comprises: generating a user credential for a user of a client machine, wherein this user credential comprises authorization data for the user, an authenticated identity of the user, an expiration time of the credential, and a last authentication time of the user; requesting, by the user, an execution of a secure process on a server connected to the client machine through a network; providing the user credential to the server for use with the requested execution; performing the requested execution; and refreshing the credential if the credential is determined to be expired during the execution, wherein the expiration is determined by checking the expiration time, and wherein the execution continues by using the refreshed credential.

Preferably, the credential refreshing further comprises: comparing the last authentication time to a system-wide invalidation time and to a user-specific invalidation time for the user to determine whether the user credential is refreshable; generating the refreshed credential from the user credential, wherein the expiration time is set to a new expiration time, when the user credential is refreshable; and generating an error condition and halting further execution when the user credential is not refreshable. The credential refreshing may further comprise ensuring that an account of said user is still valid.

Alternatively, the credential refreshing may further comprise: comparing the last authentication time to a system-wide invalidation time; and halting execution when the comparison determines that the last authentication time is earlier than the system-wide invalidation time.

In another aspect, this technique comprises: generating a user credential for a user of a client machine, wherein the user credential comprises authorization data for this user, an authenticated identity of the user, and a time value for the credential; for requesting, by the user, an execution of a secure process on a server connected to the client machine through a network; providing said the credential to the server for use with the requested execution; performing the requested execution; and refreshing the credential if the credential is determined to be expired during execution, wherein the expiration is determined by checking the time value, and wherein execution continues by using the refreshed credential.

In this aspect, the credential refreshing preferably further comprises: comparing the time value to a system-wide invalidation time and to a user-specific invalidation time for this user to determine whether the user credential is refreshable; generating the refreshed credential from the user credential, wherein the time value is set to a new time value, when the user credential is refreshable; and generating an error condition and halting further execution when the user credential is not refreshable.

This aspect may also further comprise: comparing the time value to a system-wide invalidation time; and halting execution when the comparison determines that the time value is less than the system-wide invalidation time. The comparison may further comprise ensuring that an account of said user is still valid.

In this aspect, the time value may comprise either: (I) an expiration time computed by adding a predetermined credential validity period to a last authentication time of the user, or (ii) a credential creation time set to a last authentication time of the user, and wherein the expiration of the time value is computed by adding a predetermined credential validity period to the time value.

The present invention will now be described with reference to the following drawings, in which like reference numbers denote the same element throughout.

DESCRIPTION OF THE PREFERRED EMBODIMENT

Figure 1:
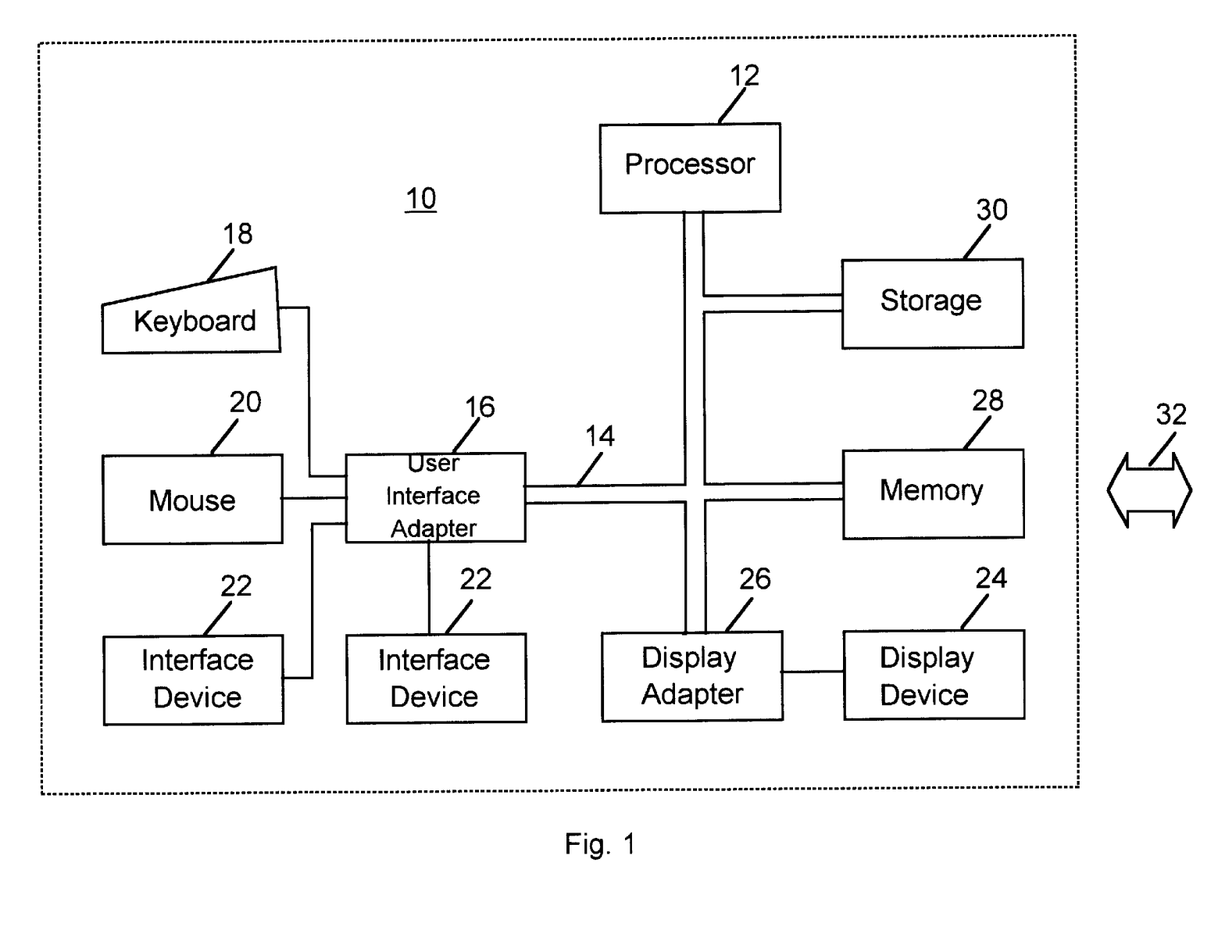
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
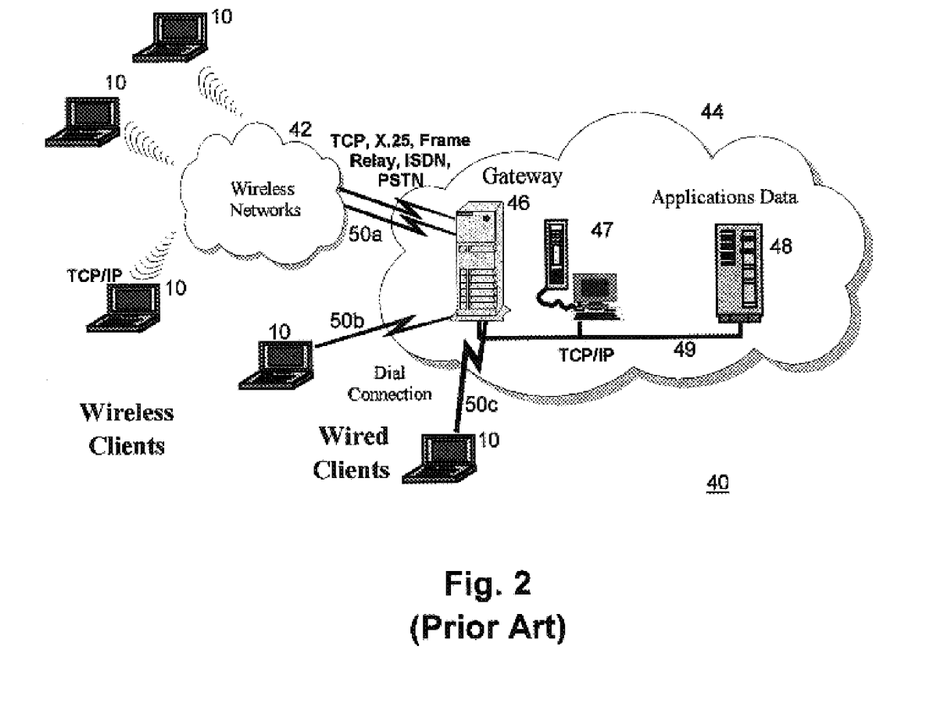
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be coupled to another network 42 by means of a communications link 50*a*. The gateway 46 may also be directly coupled to one or more workstations 10 using a communications link 50*b* , 50*c*. The gateway computer 46 may be implemented utilizing an Enterprise Systems Architecture/370 available from the International Business Machines Corporation (IBM), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 may connect to the gateway 46 using a network connection 50*a* such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50*b* or 50*c*. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 and server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be downloaded or distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein. Note that workstation 10 may also be a server (not a micro-processor) and server 47 may be a micro-processor. Note further that workstation 10 and server 47 may be the same device, running both the client and the server-side of the software code.

A user of the present invention at a client computer may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiments, the present invention is implemented as one or more modules (also referred to as code subroutines, or "objects" in object-oriented programming) of a computer software program (or programs) which provides dynamic refresh of a client's credential. The invention may be used in the Internet environment or in a corporate intranet, extranet, or any other network environment. The program code of the preferred embodiment may be implemented as objects in an object-oriented programming language, or in a conventional procedurally-oriented language, or in a mix of object-oriented and procedural language code. In the preferred embodiments, the code of the present invention operates on the server. In an optional aspect of the preferred embodiments (discussed below), additional code also operates on the client machine.

The preferred embodiment of the present invention will now be discussed in more detail with reference to FIGS. 3 and 4.

Figure 3:
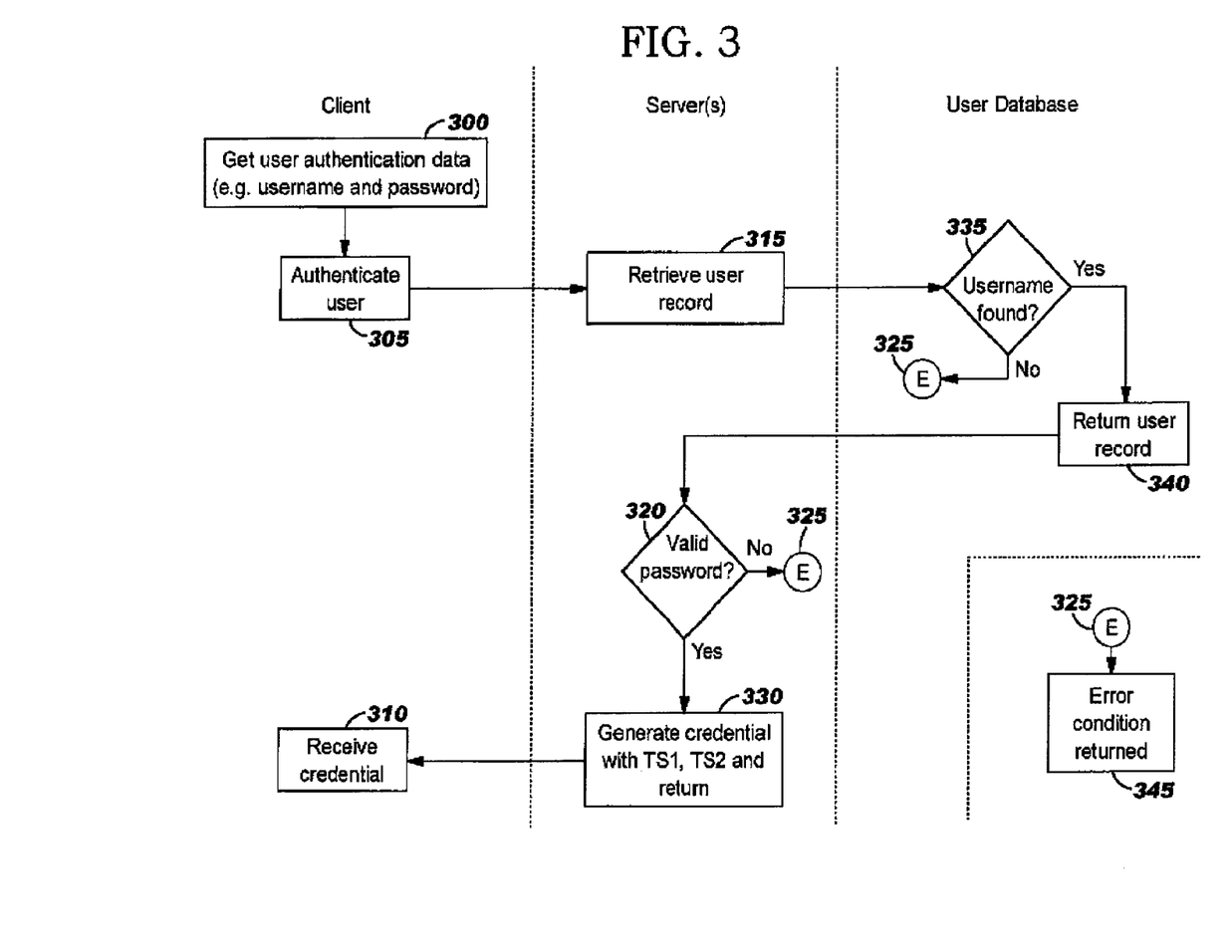
FIG. 3 provides a flow chart illustrating the logic with which a client establishes credentials to be used in a client/server environment according to the preferred embodiments of the present invention.

FIG. 3 provides a flow chart illustrating the logic with which a client establishes credentials to be used in a client/server environment according to the preferred embodiments of the present invention. When a client begins working with a particular application in the client/server environment, user authentication data such as a user name and password is used to authenticate the client to the server. Thus, at Block 300, the client machine acquires the user name and password from the user of the client machine. At Block 305, the client machine sends this information to the server where the authentication process occurs. The server, at Block 315, sends a request to a user database (or other repository) for the client's user record, providing the user name received from the client. The user database comprises stored records which contain account information including passwords, authorizations, etc. This user database may be located on the same server as the implementation of the present invention, or it may be located on a different server. The user database at Block 335 attempts to locate the user record for the user name provided by the server. If the user record does not exist, an error is generated at Block 325 which is ultimately propagated back to the client (see Block 345). If the user record is found at Block 335, then the record is returned to the requesting server at Block 340. At Block 320, the server attempts to authenticate the client (and ultimately the user) by comparing the authentication data (hereinafter referred to as a "password" for ease of reference) provided by the client to the password stored in the user record. If the passwords do not match, an error is generated at Block 325 which returns an error to the client (and ultimately the user). If the password does match, the server at Block 330 will generate a credential for the client. This credential comprises the authorizations for this client (user) and, in the first preferred embodiment of the present invention, two timestamps. The timestamps are created for (1) an expiration timestamp (TS1) of the credential and (2) a timestamp (TS2) of when the last user authentication occurred (e.g. when the last password validation was performed for this user by executing the processing at Block 320). The new credential, including the authorizations for the client and the two timestamps, is then sent by the server to the client (Block 330) and received by the client at Block 310. The client now has credentials granting access to authorized resources in the client/server environment. The client, at this point, may begin client/server processes (as described by FIG. 4) or may elect to perform the processes at a later time.

Figure 4:
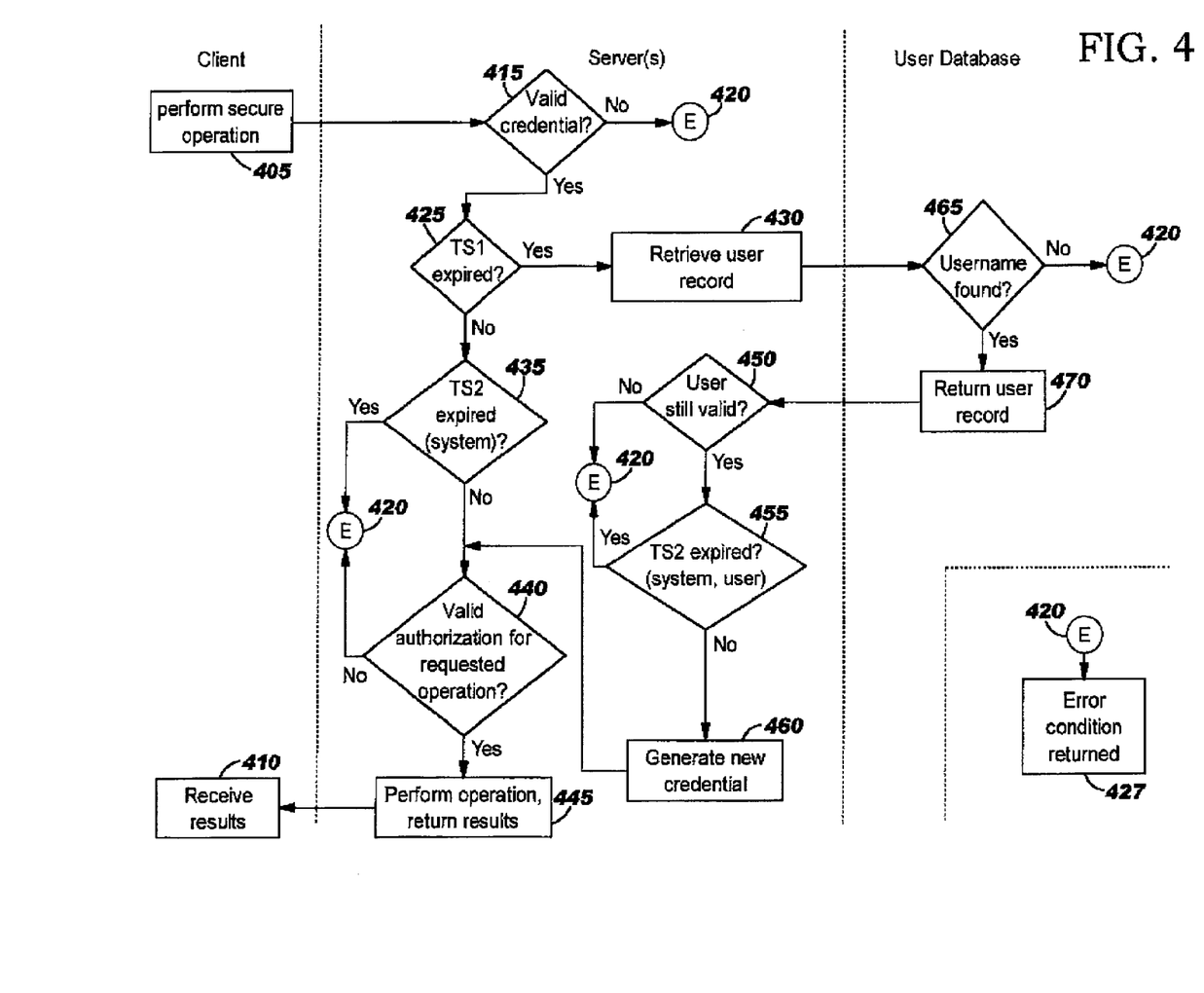
FIG. 4 depicts the logic involved in the preferred embodiments of the present invention to determine whether a client credential needs to be refreshed during in-process secure operations, and if so, performing the refresh dynamically.

FIG. 4 depicts the logic involved in the preferred embodiments of the present invention to determine whether a client credential needs to be refreshed during in-process secure operations, and if so, performing the refresh dynamically. The process begins at Block 405, where the client initiates a secure client/server process. Included in this request for processing are the credentials established from FIG. 3, Block 310. (Alternatively, the credentials may be sent separately, for example upon request of the server after determining that credentials are required for the requested operation.) The server, upon receipt of the request from the client, verifies the credentials (Block 415) using a fast, local operation that does not involve time consuming network access to a remote server. Preferably, this verification comprises checking that the credentials were generated by a trusted party, and that they have not been forged or altered.

If the credential is invalid, then an error is generated at Block 420 and returned to the client (see Block 427). If the check at Block 415 is successful (i.e. the credentials are valid), the server then checks TS1 (the timestamp when the credential expires) to determine if the credential has expired (Block 425). If the timestamp has not expired (a "No" at Block 425), then the server checks (at Block 435) the timestamp TS2 (the timestamp when the last user authentication occurred) against a system-wide timestamp. The system-wide timestamp is established by a trusted person such as a system administrator, and is used to allow the administrator to cause all credentials issued prior to the system-wide timestamp to be invalidated. This system-wide timestamp can also be used to force all users to re-authenticate themselves with a password and retrieve completely new credentials. For example, when a security breach is suspected (or detected), the administrator can set the system-wide timestamp to the current time. This action would cause all credentials and users of the system to be invalidated (since all user's timestamps and credentials would have older timestamps). To re-access the system, all users would have to re-authenticate themselves with a password and retrieve new credentials for the resources they needed to access.

If the check of TS2 determines that it has expired (i.e. a "yes" at Block 435), then at Block 420, an error is generated and returned to the client. If TS2 has not expired, then processing continues to Block 440 where the server then checks the authenticated user's authorization to perform the requested operation. If the user has been given the appropriate authorizations for the requested processing and resources, then the server performs the operations and returns the results to the client (Block 445). The client receives the results at Block 410. If, however, the credentials are not valid for the requested operation (i.e. a "No" at Block 440), the server will generate an error (Block 420) and return it to the client. (Note that information used in determining whether the user is authorized for the requested operation may come from the credentials, from stored information such as the record from the user database, or both.)

Returning to Block 425, if the check of timestamp (TS1) determines that the credential has expired (i.e. a "Yes" result), then the server requests the user record (Block 430) from the user database for the user name provided by the client. The user database, at Block 465, determines if the user name exists. If a user record for the user name does not exist, an error is generated (Block 420) which is returned to the client. If a user record does exist for this user name, the record is returned to the server at Block 470. At Block 450, the user record is checked to determine if the account for this user is still valid. This check is provided for the case, inter alia, when a user record exists but for some reason, the user's authorizations have changed. For example, an employee working in the payroll department would normally be allowed access to the company's sensitive payroll information. If that same employee took another position in the same company, the user name would typically remain the same, but their privileges (in this case, access to the payroll information) would change.

If the check at Block 450 failed (i.e. the user account was no longer valid), then an error (at Block 420) is generated and returned to the client. If the user is determined to be still valid at Block 450, then the server checks the timestamp TS2 at Block 455 against the system-wide timestamp (discussed earlier) as well as a user-specific timestamp (previously stored in the user database entry for this user by a process or a person such as the system administrator, and returned to the server at Block 470). The user-specific timestamp is used by the system administrator to force a specific user to re-authenticate using a password. This process is typically used when an individual password has been breached for a user, and does not affect the other users of the system (as does resetting the system-wide timestamp). If the system-wide timestamp or the user-specific timestamp are newer than the TS2 timestamp at Block 455, then the TS2 timestamp has expired and an error is generated at Block 420. If the TS2 timestamp has not expired (i.e. it is newer than the system-wide and user-specific timestamps), then processing continues to Block 460. At Block 460, a new (refreshed) credential is created for the client. This new credential specifies authorizations for this user, as well as timestamps TS1 and TS2. TS1 is preferably set to a value computed by adding a predetermined interval to the current time. TS2 is preferably copied from the credential which is being refreshed. (Alternatively, TS2 could be set to the current time.)

Processing then continues to Block 440 where the authorizations are verified (as discussed earlier). If the credentials do not contain the appropriate authorization, an error is generated at Block 420 and returned to the client. If the credentials contain the appropriate authorization, the server performs the requested operations (as discussed earlier) at Block 445 with the results of the processing received by the client at Block 410.

In a first alternative preferred embodiment, a single timestamp may be used. This timestamp, TS1, represents the creation time of the credential (instead of the expiration time, as discussed in the preferred embodiment). In this embodiment, the refreshing of a credential is treated as the last authentication for the user, and thus there is no need for the TS2 timestamp (the time when the last user authentication occurred) since the server creates similar information to the TS2 timestamp by performing calculations on the TS1 timestamp.

With regard to FIG. 3, the changes to the logic for this alternative embodiment occur at Block 330, where the credential is created using only one timestamp TS1 representing the credential creation time, and the second timestamp TS2 is omitted. Preferably, the credential creation time is set to the current time, obtained from the system clock.

With regard to FIG. 4, processing for this alternative embodiment occurs unchanged up to Block 425. At Block 425, the server determines the lifetime of a credential by accessing a system-wide setting which represents the lifetime value for credentials. This value is set by a trusted individual, such as a system administrator, to a predetermined amount of time after which credentials expire or become invalid (e.g. anywhere from 1 to 24 hours or more). The server then computes the time when the credential expires by adding the credential creation timestamp TS1 and the value for the system-wide lifetime of credentials. The result of this computation is then used to determine if the credential has expired. If the credential has not expired, then processing continues to Block 435. At Block 435, the server now compares the TS1 timestamp (creation time of the credential) to the system-wide timestamp for credentials, to determine if the credential is still valid. As discussed earlier, the system-wide timestamp for credentials is used to allow a trusted individual such as a system administrator to cause all credentials to become invalid. If the credential has not expired, then processing continues at Block 440 (as discussed earlier, with reference to the first preferred embodiment). If the credential has expired at Block 435, then processing (as before) continues to Block 420 where an error is generated and returned to the client (Block 427).

Returning to Block 425, if the server determines that the credential has expired (a "Yes" result), then processing continues to Block 430, as discussed earlier. Now at Block 455, the timestamp TS1 is used to determine if the use's credentials can be refreshed. The timestamp TS1 is compared to the system-wide timestamp as well as the user-specific timestamp (as discussed in the preferred embodiment) to determine if the server should generate a new credential for this user or require the user to re-authenticate himself to the system. If the credential can be refreshed, then processing continues at Block 460. The refreshed credential is generated at Block 460 in the same manner described for the first preferred embodiment, except that the TS2 value is omitted. If the credential cannot be refreshed, then an error is generated at Block 420 and returned to the client (Block 427).

Alternatively, the value of TS1 in the first alternative embodiment may be set to the expiration time of the credential instead of the creation time. In Block 330 of FIG. 3, the timestamp used would represent the expiration time of the credential. This value is preferably calculated by adding the system-wide lifetime value for credentials (as discussed earlier) to the current time, resulting in the expiration time for the credential. This calculated value is stored in timestamp TS1. Now at Block 425, Block 435, and Block 455 of FIG. 4, the server, in this alternative embodiment, uses the TS1 timestamp without the need to calculate the expiration time (which was required in the first alternative embodiment).

As an optional enhancement to the preferred embodiments, the refreshed credential (generated in Block 460) may be returned to the client. This enhancement requires client-side logic to handle this refreshed credential (e.g. to receive it, store it, and then use it for subsequent secure operations). The advantage of this enhancement is that it avoids the client beginning a new secure operation with an already-expired credential that falls within the parameters (i.e. timestamp values) when a refresh (according to the techniques defined herein) would be allowed.

In a further optional aspect of the preferred embodiments, a pre-emptive credential refreshing feature may be used. When implemented, this aspect may be used if the client determines that the credential that he is using is about to expire, and preferably comprises the following: passing the current credential from the client to the authentication server; performing the functions as described above (with reference to the first preferred embodiment) for Blocks 430, 465, 470, 450, 455, and 460; and returning the generated new (refreshed) credential to the client.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A computer program product embodied on a computer-readable medium, for dynamically refreshing user credentials without disruption of an on-going secure process, comprising:

computer-readable code means for generating a user credential for a user of a client machine, wherein said user credential comprises authorization data for said user, an authenticated identity of said user, an expiration time of said credential, and a last authentication time of said user;

computer-readable code means for requesting, by said user, an execution of a secure process on a server connected to said client machine through a network;

computer-readable code means for providing said user credential to said server for use with said requested execution;

computer-readable code means for performing said requested execution; and computer-readable code means for refreshing said credential if said credential is determined to be expired during operation of said computer-readable code means for performing, wherein said expiration is determined by checking said expiration time, and wherein said computer-readable code means for performing continues by using said refreshed credential.

2. The computer program product for dynamically refreshing user credentials according to claim 1, wherein said computer-readable code means for refreshing further comprises:

computer-readable code means for comparing said last authentication time to a system-wide invalidation time and to a user-specific invalidation time for said user to determine whether said user credential is refreshable;

computer-readable code means for generating said refreshed credential from said user credential, wherein said expiration time is set to a new expiration time, when said user credential is refreshable; and computer-readable code means for generating an error condition and halting further operation of said computer-readable code means for performing when said user credential is not refreshable.

3. The computer program product for dynamically refreshing user credentials according to claim 1, further comprising:

computer-readable code means for comparing said last authentication time to a system-wide invalidation time; and computer-readable code means for halting operation of said computer-readable code means for performing when said computer-readable code means for comparing determines that said last authentication time is earlier than said system-wide invalidation time.

4. The computer program product for dynamically refreshing user credentials according to claim 2, wherein said computer-readable code means for comparing further comprises computer-readable code means for ensuring that an account of said user is still valid and if not, concluding that said user credential is not refreshable.

5. A computer program product embodied on a computer-readable medium, for dynamically refreshing user credentials without disruption of an on-going secure process, comprising:

computer-readable code means for generating a user credential for a user of a client machine, wherein said user credential comprises authorization data for said user, an authenticated identity of said user, and a time value for said credential;

computer-readable code means for requesting, by said user, an execution of a secure process on a server connected to said client machine through a network;

computer-readable code means for providing said user credential to said server for use with said requested execution;

computer-readable code means for performing said requested execution; and computer-readable code means for refreshing said credential if said credential is determined to be expired during operation of said computer-readable code means for performing, wherein said expiration is determined by checking said time value, and wherein said computer-readable code means for performing continues by using said refreshed credential.

6. The computer program product for dynamically refreshing user credentials according to claim 5, wherein said computer-readable code means for refreshing further comprises:

computer-readable code means for comparing said time value to a system-wide invalidation time and to a user-specific invalidation time for said user to determine whether said user credential is refreshable;

computer-readable code means for generating said refreshed credential from said user credential, wherein said time value is set to a new time value, when said user credential is refreshable; and computer-readable code means for generating an error condition and halting further operation of said computer-readable code means for performing when said user credential is not refreshable.

7. The computer program product for dynamically refreshing user credentials according to claim 5, further comprising:

computer-readable code means for comparing said time value to a system-wide invalidation time; and computer-readable code means for halting operation of said computer-readable code means for performing when said computer-readable code means for comparing determines that said time value is less than said system-wide invalidation time.

8. The computer program product for dynamically refreshing user credentials according to claim 6, wherein said computer-readable code means for comparing further comprises computer-readable code means for ensuring that an account of said user is still valid and if not, concluding that said user credential is not refreshable.

9. The computer program product for dynamically refreshing user credentials according to claim 5, wherein said time value is an expiration time computed by adding a predetermined credential validity period to a last authentication time of said user.

10. The computer program product for dynamically refreshing user credentials according to claim 5, wherein said time value is a credential creation time set to a last authentication time of said user, and wherein said expiration of said time value is computed by adding a predetermined credential validity period to said time value.

11. A computer system for dynamically refreshing user credentials without disruption of an on-going secure process, comprising:

means for generating a user credential for a user of a client machine, wherein said user credential comprises authorization data for said user, an authenticated identity of said user, an expiration time of said credential, and a last authentication time of said user;

means for requesting, by said user, an execution of a secure process on a server connected to said client machine through a network;

means for providing said user credential to said server for use with said requested execution;

means for performing said requested execution; and means for refreshing said credential if said credential, is determined to be expired during operation of said means for performing, wherein said expiration is determined by checking said expiration time, and wherein said means for performing continues by using said refreshed credential.

12. The system for dynamically refreshing user credentials according to claim 11, wherein said means for refreshing further comprises:
  means for comparing said last authentication time to a system-wide invalidation time and to a user-specific validation time for said user to determine whether said user credential is refreshable;
  means for generating said refreshed credential from said user credential, wherein said expiration time is set to a new expiration time, when said user credential is refreshable; and
  means for generating an error condition and halting further operation of said means for performing when said user credential is not refreshable.

13. The system for dynamically refreshing user credentials according to claim 11, further comprising:
  means for comparing said last authentication time to a system-wide invalidation time; and
  means for halting operation of said means for performing when said means for comparing determines that said last authentication time is earlier than said system-wide invalidation time.

14. The system for dynamically refreshing user credentials according to claim 12, wherein said means for comparing further comprises means for ensuring that an account of said user is still valid and if not, concluding that said user credential is not refreshable.

15. A system for dynamically refreshing user credentials without disruption of an on-going secure process, comprising:
  means for generating a user credential for a user of a client machine, wherein said user credential comprises authorization data for said user, an authenticated identity of said user, and an expiration time of said credential, and wherein said expiration time is computed using a last authentication time of said user;
  means for requesting, by said user, an execution of a secure process on a server connected to said client machine through a network;
  means for providing said user credential to said server for use with said requested execution;
  means for performing said requested execution; and
  means for refreshing said credential if said credential is determined to be expired during operation of said means for performing, wherein said expiration is determined by checking said expiration time, and wherein said means for performing continues by using said refreshed credential.

16. The system for dynamically refreshing user credentials according to claim 15, wherein said means for refreshing further comprises:
  means for comparing said expiration time to a system-wide invalidation time and to a user-specific invalidation time for said user to determine whether said user credential is refreshable;
  means for generating said refreshed credential from said user credential, wherein said expiration time is set to a new expiration time, when said user credential is refreshable; and
  means for generating an error condition and halting further operation of said means for performing when said user credential is not refreshable.

17. The system for dynamically refreshing user credentials according to claim 15, further comprising:
  means for comparing said expiration time to a system-wide invalidation time; and
  means for halting operation of said means for performing when said means for comparing determines that said expiration time is less than said system-wide invalidation time.

18. The system for dynamically refreshing user credentials according to claim 16, wherein said means for comparing further comprises means for ensuring that an account of said user is still valid and if not, concluding that said user credential is not refreshable.

19. A method for dynamically refreshing user credentials without disruption of an on-going secure process, comprising the steps of:
  generating a user credential for a user of a client machine, wherein said user credential comprises authorization data for said user, an authenticated identity of said user, an expiration time of said credential, and a last authentication time of said user;
  requesting, by said user, an execution of a secure process on a server connected to said client machine through a network;
  providing said user credential to said server for use with said requested execution;
  performing said requested execution; and
  refreshing said credential if said credential is determined to be expired during operation of said performing step, wherein said expiration is determined by checking said expiration time, and wherein said performing step continues by using said refreshed credential.

20. The method for dynamically refreshing user credentials according to claim 19, wherein said refreshing step further comprises the steps of:
  comparing said last authentication time to a system-wide invalidation time and to a user-specific invalidation time for said user to determine whether said user credential is refreshable;
  generating said refreshed credential from said user credential, wherein said expiration time is set to a new expiration time, when said user credential is refreshable; and
  generating an error condition and halting further operation of said performing step when said user credential is not refreshable.

21. The method for dynamically refreshing user credentials according to claim 19, further comprising the steps of:
  comparing said last authentication time to a system-wide invalidation time; and
  halting operation of said performing step when said comparing step determines that said last authentication time is earlier than said system-wide invalidation time.

22. The method for dynamically refreshing user credentials according to claim 20, wherein said comparing step further comprises the step of ensuring that an account of said user is still valid and if not, concluding that said user credential is not refreshable.

23. A method for dynamically refreshing user credentials without disruption of an on-going secure process, comprising the steps of:
  generating a user credential for a user of a client machine, wherein said user credential comprises authorization data for said user, an authenticated identity of said user, and a credential creation time set to a last authentication time of said user;

requesting, by said user, an execution of a secure process on a server connected to said client machine through a network;

providing said user credential to said server for use with said requested execution;

performing said requested execution; and refreshing said credential if said credential is determined to be expired during operation of said performing step, wherein said expiration is determined by adding a predetermined credential validity period to said credential creation time, and wherein said performing step continues by using said refreshed credential.

24. The method for dynamically refreshing user credentials according to claim 23, wherein said refreshing step further comprises the steps of:

comparing a result of adding said credential creation time and said predetermined credential validity period to a system-wide invalidation time and to a user-specific invalidation time for said user to determine whether said user credential is refreshable;

generating said refreshed credential from said user credential, wherein said credential creation time is set to a new credential creation time, when said user credential is refreshable; and generating an error condition and halting further operation of said performing step when said user credential is not refreshable.

25. The method for dynamically refreshing user credentials according to claim 23, further comprising the steps of:

comparing a result of adding said credential creation time and said predetermined credential validity period to a system-wide invalidation time; and halting operation of said performing step when said comparing step determines that said result is less than said system-wide invalidation time.

26. The method for dynamically refreshing user credentials according to claim 24, wherein said comparing step further comprises the step of ensuring that an account of said user is still valid and if not, concluding that said user credential is not refreshable.

27. A method for dynamically refreshing user credentials in a computing environment, comprising steps of:

determining, during execution of a secure process, that a user credential has expired, the user credential representing a user on whose behalf the secure process is executed;

transparently refreshing the expired user credential, responsive to the determining step, without requesting input from the user and without discontinuing execution of the secure process; and continuing execution of the secure process using the refreshed user credential.

* * * * *